T. COOK.
ELECTROMAGNETIC APPARATUS.
No. 1,735. Patented Aug. 25, 1840.
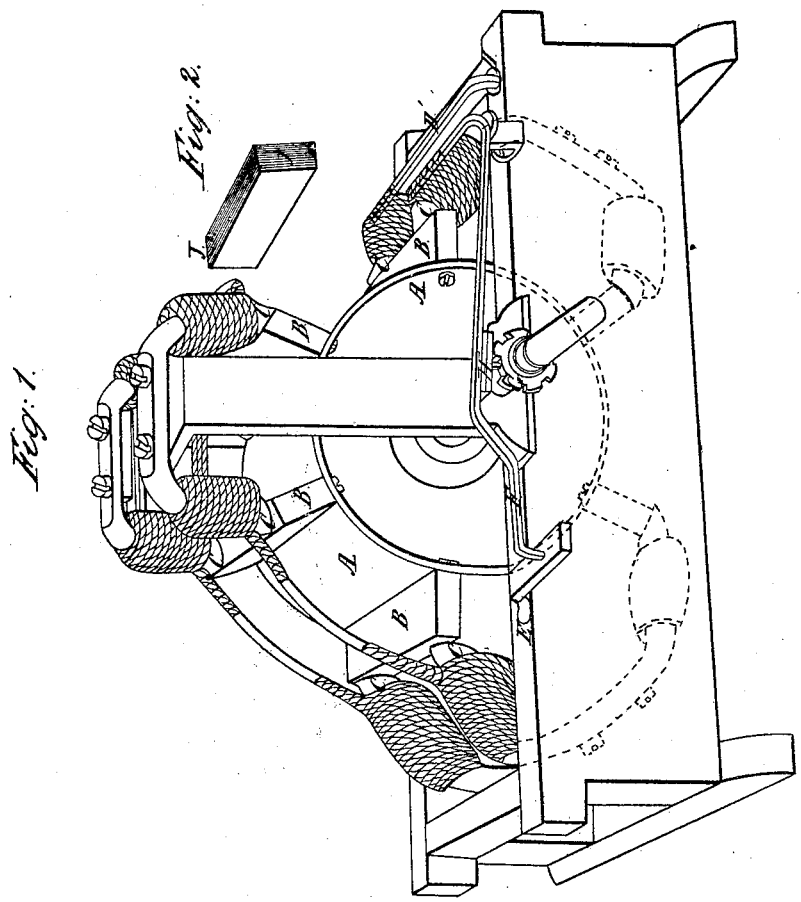

T. COOK.
ELECTROMAGNETIC APPARATUS.
No. 1,735. Patented Aug. 25, 1840.
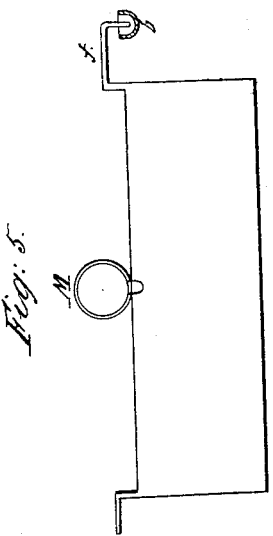
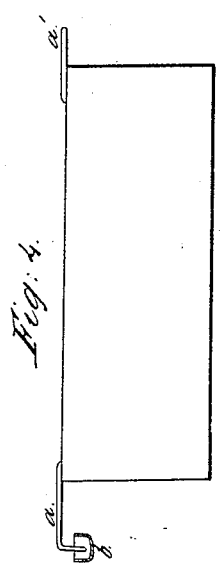
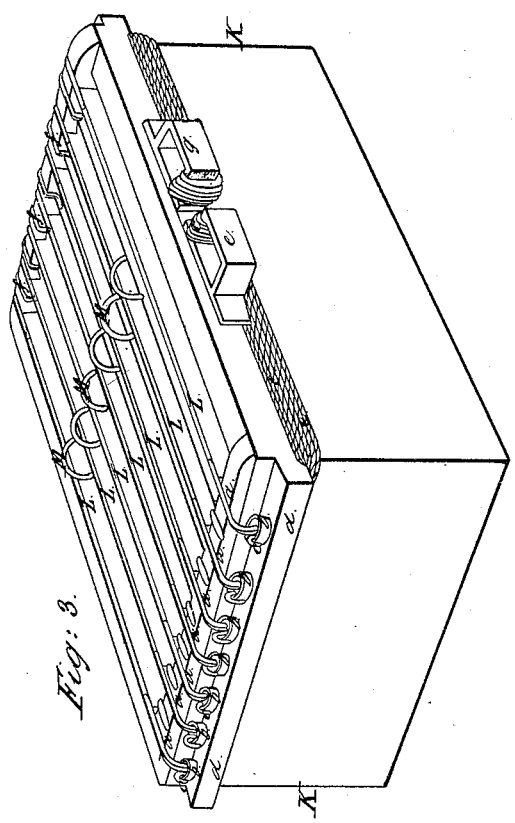

UNITED STATES PATENT OFFICE.

TRUMAN COOK, OF NEW YORK, N. Y.

IMPROVEMENT IN ELECTRO-MAGNETIC MACHINES, &c.

Specification forming part of Letters Patent No. 1,735, dated August 25, 1840

*To all whom it may concern:*

Be it known that I, TRUMAN COOK, of the city of New York, in the State of New York, have made certain improvements in the manner of constructing an electro-magnetic machine for the purpose of obtaining motive power for the propelling of machinery in general, and that I have also made certain improvements in the manner of constructing and arranging the battery by which the electric fluid is to be developed; and I do hereby declare that the following is a full and exact description thereof.

In the accompanying drawings, Figure 1 represents my electro-magnetic machine in perspective, and Fig. 2 the battery in the improved form that I have given to it; but the electro-magnetic machine may be actuated by batteries in any of the known forms.

In the electro-magnetic machine A A is a cylinder or drum, which may be made of wood, brass, or any other material not affected by the magnetic influence. Upon the periphery of this drum I place six or any other convenient number of pieces of soft iron, as shown at B B B. These stand at equal distances apart, extend from end to end of the drum parallel to its axis, and are made perfectly true on their surfaces, so that in the revolution of the drum they may come nearly into contact with the electro-magnets C C C C. They may be varied in form, but that of a parallelogram placed edgewise, as shown in the drawings, is to be preferred. These pieces B B are denominated "armatures."

The electro-magnets C C C C, bent in the form of what are usually called "horseshoe" or "U" magnets, are placed in pairs, so that the opposite poles of each of them shall at the same instant stand immediately over the ends of two contiguous keepers, as shown in the drawings. In forming these magnets, it is necessary, therefore, so to bend them as that the space between their two poles shall be exactly equal to that of the distance of the armatures from each other.

The manner of constructing the electro-magnets so as to excite the magnetic influence by electric induction so far as the coils of prepared copper are concerned is the same with that adopted in other apparatus of a similar character.—In the machine as represented there are three pairs of these electro-magnets, the two lower pairs being in part hidden by the frame of the machine, where they are shown by dotted lines.

D is a mercury-cup, into which the ends of the wires D', forming one termination of the electric poles, are immersed.

E is a mercury-cup, into which the wires F, forming the termination of the opposite electric pole, may be made to dip, and from which it is to be lifted by the cam-wheel G, fixed upon the shaft of the revolving drum A A. The notches in this cam-wheel correspond with the number of the armatures on the revolving drum, and are so arranged as to suspend the transmission of the electric current, and consequently the magnetic induction, at the proper moment, for allowing the armatures to pass the magnets.

H is a piece of ivory or other non-conductor of electricity, having a projecting tooth, which raises the wires F by the action of the cam. In the drawings these wires are not represented as dipping into the mercury-cup E, but as resting upon a piece of metal which forms a conducting communication with the said cup, and therefore produces a like result. Into the mercury-cups D and E the negative and positive wires of the battery are to dip in the usual manner.

I have already stated that the magnets are placed in pairs, as represented, and that in each individual magnet the distance between its north and south pole is equal to the distance apart of the respective armatures. The length of these armatures, however, is less than that of their distance from each other, and the north and south poles of the magnets constituting each pair are at a distance apart corresponding with the length of the armatures. The influence of the magnetic arch is consequently exerted between the opposite poles of the magnets constituting the pair, this resulting from their proximity being greater than that of the opposite poles of each individual magnet—an effect not produced by any arrangement of electro-magnets heretofore adopted, and which, indeed, could not take place, the magnets having been placed at right angles to the position given to them by me. It must be perceived that these magnets operate in pairs, one of them extending its influence directly to the other, thus mutually actuating the armatures as they approach.

I have represented the armatures and magnets as made of solid bars or pieces of metal; but I have ascertained that the magnetic power may be augmented to a very great extent by forming the armatures, and also the ends of the magnets, around which the covered wire is wound, of plates of soft iron. In forming the armatures in this way I take pieces of sheet-iron of the length and width of the armature and place these upon each other, separating them by narrow strips of sheet-copper interposed between them at each end. The strips of iron and of copper may be united by brazing or in any other convenient manner. The number of plates is to be such as to give the desired thickness to the armatures. After uniting the plates their edges are to be dressed off true, and they are then to be affixed in place. In Fig. 3 I have represented one of the armatures so made, the strips of copper being shown as interposed at the ends J J. The plates of copper might run the whole length of the armatures, but this would not be productive of any advantage. When I make the magnets to operate in the same way—that is to say, with multiplied surfaces—I take plates of iron of the proper length, width, and thickness, lay them upon each other, and weld them together at the middle part, being that which forms the connecting-bar between the ends which are to constitute the poles, thus leaving those ends in separate plates, between each of which a plate of copper is to be interposed and affixed, by soldering or otherwise, so as to give the requisite solidity to the ends to admit of their being wrought into the proper form and duly wound with the covered wire.

I have represented and spoken of one revolving drum with its armatures and pairs of magnets corresponding therewith; but to augment the power of the machine there may be two, three, four, or more of such sets of apparatus, with one axis common to each, or with their axes coupled together in one straight line. In this case the armature placed upon the respective drums are to break joints with each other, so that the magnetic power may be induced and suspended on each set at a different moment. A separate cam-wheel, with its appurtenances, must, of course, be appropriated to each section of the apparatus.

Fig. 3 is my improved galvanic battery. K K is the trough for containing the plates of zinc and copper, zinc and lead, or other metal. These plates are kept entirely separate and distinct from each other, so that either of them may be lifted from the trough by itself, there not being any connecting strip of metal to combine the respective zinc plates or the respective copper plates with each other, the connection between them being effected by conducting-wires upon them, which dip into mercury-cups, and by conducting-wires leading from these mercury-cups into two small cisterns of mercury, which constitute the efficient poles of the battery.

L L are plates of copper, lead, or other metal suited to become electro-negative. Alternating with these plates of copper, &c., are plates of zinc, to which the wire loops M M are fastened, for the purpose of lifting them from the trough, these being convenient, as the zinc plates are made about an inch narrower than the copper plates and stand that distance below the top edge of the box, while the plates L L stand even with or rise above it, their upper edges being usually uncovered by the contained liquid. I have found, however, that all the plates may be under the solution without interfering with their action. This is contrary to the received opinion, but is, nevertheless, true.

Fig. 4 shows one of the copper, and Fig. 5 one of the zinc, plates. The wires $a\ a'$ of the copper plates rest on the edge of the trough, the wires $a$ being bent down and dipping into mercury-cups $b\ b\ b$. From these cups proceed wires, which pass down through the strip $d\ d$, extend along the end and front of the trough, and enter the quicksilver-cistern $e$, this cistern thus constituting the negative end of the battery. The wires $f\ f\ f$ of the zinc plates in like manner dip into mercury-cups at the opposite part of the battery. These are not seen in the drawings, but they are like those shown, and are furnished with wires connecting them with the mercury-cistern $g$, thus constituting it the positive pole.

The liquid which I have found to be most effective in producing the galvanic action is a solution of sulphate of copper, to which I add a small quantity of sulphuric acid and some common salt. This liquid continues to act for a greater length of time and more equally than any which I have essayed. I also prefer plates of lead to those of copper for obtaining the electro-negative action, although either will answer the purpose.

Having thus fully described the manner in which I construct my electro-magnetic apparatus, and likewise the manner of making the improved galvanic trough for actuating the same, what I claim therein as constituting my invention, and desire to secure by Letters Patent, is—

1. The arranging of the armatures B B upon a cylinder or drum, in combination with the pairs of electro-magnets so situated as that the negative and positive pole of each individual magnet shall at the same moment be over two contiguous armatures, in the manner herein fully set forth, and represented in the accompanying drawings.

2. The mode of interrupting the galvanic circuit by means of the cams or notches on the axis of the cylinder operating the wires which dip into the cups of mercury, as set forth, in combination with the stationary magnets and revolving armatures, arranged and constructed as herein described.

3. The galvanic battery herein described, composed of separate and distinct plates communicating with cups of mercury, in the manner and for the purpose herein set forth, in combination with the electro-magnetic apparatus consisting of stationary magnets and revolving armatures, constructed and operating in the manner herein described.

TRUMAN COOK.

Witnesses:
   THOS. P. JONES,
   HUGH RONALDS.